Patented Oct. 13, 1931

1,826,900

UNITED STATES PATENT OFFICE

HANS SCHRADER, OF ESSEN-RUHR, GERMANY, ASSIGNOR TO THE FIRM OF TH. GOLDSCHMIDT A.-G., OF ESSEN-RUHR, GERMANY

PROCESS OF PRODUCING EMULSIONS    REISSUED

No Drawing. Application filed October 24, 1928, Serial No. 314,837, and in Germany August 27, 1927.

This invention relates to a process of producing emulsions in which partially esterified polyhydric alcohols or derivatives thereof are employed in conjunction with fatty acids of high molecular weight or derivatives thereof, as emulsifying agents. It has been found that these partially esterified compounds in so far as they still contain free alcoholic hydroxyl groups, possess the property of forming very stable emulsions with water or aqueous solutions in the presence of substances with an alkaline reaction, such emulsions remaining stable even at elevated temperatures. Among esters of this kind are for example the mono- or di-glycerol esters and the mono- or di-glycol esters, such as for example. glycol mono-oleic acid ester (glycol mono-oleate). The derivatives of esters of the polyhydric alcohols are however also eminently adaptable for this purpose, provided these esters possess non-esterified alcoholic hydroxyl groups. In particular the esters of the hydroxylated fatty acids have been found to be advantageous and relatively easily obtainable, as well as esters which contain ethereal poly-compounds of polyhydric alcohols as alcoholic components. The ethereal poly-compounds may have similar and dissimilar alcohol radicles, and the hydroxy compounds of fatty acids, the singly and poly-unsaturated monobasic aliphatic acids come into consideration as derivatives of fatty acids with high molecular weight. Examples for these are the di-glyceride of the α- hydroxy stearic acid, the mono glycol ester of oleic acid and triethylene glycol mono stearate.

In order to prepare the emulsions these substances are emulsified either alone or in conjunction with other substances, with water or aqueous solutions in the presence of substances with an alkaline reaction. The added substances can be of very diverse natures, for example fats, fatty acids, waxes, resins, vegetable or mineral oils of all kinds, colloids such as rubber, glue, gelatine, dextrin and also terpenes, perfumes, animal and plant emulsions (latex, cow's milk) lamp-black, talc, zinc oxide and the like can be employed. A particularly excellent effect has been produced by adding the above described esters to aqueous emulsions of wool-grease. As is known aqueous wool-grease emulsions can be produced by intimately admixing wool-grease and water by rubbing. kneading or the like. These emulsions form relatively viscid salves or ointments, even when they contain as much as 80 per cent of water. On rubbing same on the skin, a greasy layer is formed which is not easily absorbed by the skin. The reason for this property is the structure of the emulsion, in which the water is distributed in small droplets throughout the wool-grease and in which the wool-grease consequently constitutes the external continuous phase. Hence the relatively poor rubbing power and greasy property of these ordinary emulsions can be understood since, on rubbing, the fat spreads over the skin like a film. If, however, the emulsions are prepared by the addition of a certain quantity of one of the above described esters to the wool-grease or to the water, then the opposite type of emulsion is obtained in which the wool-grease is dispersed in small droplets throughout the aqueous phase; the aqueous phase being continuous. These emulsions possess much more favorable properties, in particular they have a very ready spreading power, and the fat is absorbed by the skin with surprising rapidity on account of its fine state or subdivision. The proportions in mixtures of wool-grease, ester and water can be varied within wide limits; moreover a whole series of substances as for example glycerine, petroleum jelly, spermaceti, talc, borax, perfumes and the like, can be added to the emulsions.

In carrying out the present invention, the emulsions are preferably produced, by melting down the ester-soluble substances such as fats, waxes, oils and the like in the esters and then gradually stirring into the melt produced, the water or the aqueous solution to be employed, which also contains the substances having an alkaline reaction.

The production of the esters suitable for emulsification naturally need not be effected by employing single and quite definite acids and alcohols. On the contrary, mixtures of the same can be employed, and moreover advantageously such as occur in the natural state or as are available in technical processes. According to the purpose of employment and the requirements with respect to purity of color and odor and the like, of the finished product these starting materials are subjected to a corresponding purification. Thus, for example the acids obtained in the saponification of oleaginous matter, such as oils, fats and waxes by steam or alkali are suitable raw materials for the production of esters adapted to act as emulsifying agents, olive oil, ground nut oil, linseed oil, rape-seed oil, coconut fat, wool-grease and Montan wax may be mentioned as examples of such oils, fats and waxes. Moreover, esters obtained by the re-esterification of such acids with polyhydric alcohols, such as glycol or glycerol can be used for the aforesaid purpose.

Partially esterified glycols carrying fatty acids of high molecular weight can be prepared by causing alkylene oxides to react with fatty acids or with mixtures containing the same such as natural fats or oils, in the presence of alkali salts of these acids as catalysts. The product of reaction will now contain in addition to the desired glycol esters, the alkali salts of the corresponding fatty acids, and an emulsion can be obtained immediately on treating the product with water, without it being first necessary to add separately salts with an alkaline reaction. An emulsion of this nature can be prepared for example in the following manner:

5 kgs. of stearic acid are heated with 1 kg. ethylene oxide, after the addition of 50 gr. NaOH, in an autoclave for several hours. The product obtained in this manner is emulsified with 18 kgs. of a 25 per cent glycerine solution at a temperature of 60°–70° C. On cooling a fine soft, white salve or ointment is produced which no longer gives a basic reaction with red litmus paper.

The following are further examples of the production of emulsions:

In making one containing 45 per cent lubricating oil, 4.5 per cent of glycerine di-stearate, 0.5 per cent ammonium stearate and 50 per cent water, the ester is dissolved in the lubricating oil which is heated up to about 75° C., whereupon the water is added with continual stirring. A creamy, smooth emulsion is obtained, which is applicable as a greasing and lubricating agent for the most diverse purposes.

In making another emulsion containing 20 per cent petroleum jelly, 19 per cent of tri-ethylene glycol mono-stearate, 1 per cent potassium stearate and 60 per cent water, the petroleum jelly, ester and potassium stearate are melted down together at about 70° C. The water is gradually added to the melted mass with continual stirring. A fine uniform stable emulsion is produced in which the aqueous liquid forms the outer continuous phase.

Emulsions prepared in accordance with the present invention can be employed with advantage in processes of wetting, impregnating and rendering soft and pliable fibrous or artificial materials, paper or similar materials. They can also be employed as lubricating agents, for example as solid lubricants such as Stauffer greases. They are also of advantage for cosmetic and pharmaceutical purposes, and likewise for the production of margarine and the like, that is of emulsions adapted to be used in foods, as well as for the production of boot polishes and polishing waxes.

The esters on account of their emulsifying action when employed in conjunction with substances having an alkaline reaction, are well adapted for washing and cleaning purposes, to which end, special ingredients, such as boric acid, oil of turpentine, tetra-hydro naphthalene and the like can be added. They can also be employed advantageously as superfatting agents for soaps. In particular a special technical washing effect can be produced by employing the esters in conjunction with soaps or substances having a similar action, such as saponin or the like. Thus the addition of 5 per cent of ethylene glycolmonostearate to ordinary soap results in a product which differs very advantageously from the initial soap. The foam produced is of a particular creamy nature and good consistency and the washing action of the soap is considerably enhanced by the addition. Moreover the product possesses the property, in its use in toilet soaps, of imparting a pleasant suppleness to the skin after washing, similar to that produced by the ointments made from the esters. A further advantage is the pure white color of the ester, whereas most other superfatting agents are more or less strongly colored.

Another field of application of the above-described emulsions is the fatting of fibrous materials, for example, the oiling of wool. As is well known it is necessary to impregnate the washed wool to be spun with emulsions of fats or oils with soaps or alkalies, in order that the wool may possess the requisite smoothness and suppleness during the spinning process. The efficacy of the means hitherto employed however has been very unsatisfactory in many ways. The fibres were only covered on the exterior with a film of fat and remained to all intents and purposes just as hard and brittle as they were originally. Moreover it was difficult to remove the fat-layer from the individual wool-fibres after finishing the spun-yarn. Even if the washing previous to dyeing was carried out as carefully and suitable as possible, the yarns which had been least tightly spun even crinkled and were useless for further treatment. All these disadvantages are obviated if wool oiling agents are employed which contain even only a small percentage of the above-described esters. With the use of these esters milk like emulsions are obtained which possess an outstanding wetting-power. The stability of the emulsified phase is so great, that the addition of adhesive agents is not necessary. After spinning the oils are removed completely, even from hard twisted threads, by simple rinsing in tepid, very weakly alkaline baths, this having an absolutely non-injurious effect.

The esters hereinbefore referred to have also been found to be excellent for the washing of for example raw wool. When these esters are added to the wool washing baths, then the more easily emulsifiable fatty constituents of the wool are more expeditiously loosened, than was hitherto the case. The loosening of the tanning agent does not mean the removal of the same, but the partial loosening thereof, with the result that it leaves much less fat on the wool hairs, and can subsequently be removed thoroughly by further washing and rinsing. Even solutions, the alkali content of which is far less than 1 per cent exhibit such an excellent washing effect that the washed product is obtained in an unusually clean state.

It has already been stated that not only the emulsions derived from the aforesaid esters, but also the esters themselves are pre-eminently suitable for the most diverse purposes. They can be used per se or in combination with the hereinbefore specified substances which can be added to the emulsions. In this connection it should be pointed out that the addition of acid or basic substances as the case may be, is of particular advantage in order to weaken or to neutralize basic or acid substances during the operation. A case of this kind arises for example in the treatment of weighted silk fibres with glycerine stearic ester, to which some potash soap has been added. Silk, cotton and wool yarns can be treated with ease with these esters or mixtures or solutions thereof. They thereby obtain a strength and suppleness which has never previously been attained, so that thread breakages, which frequently occurred during the weaving process, are almost completely obviated.

Moreover the dyeing properties of textile fabrics can be favorably influenced by impregnation with esters of the aforesaid type, inasmuch as cotton and artificial silk for example, which are frequently present in mixed textile fabrics, can thus be more uniformly dyed. Natural silk is in certain circumstances liable to attack by the atmosphere as soon as it is weighted with tin. If however, it is steeped with the esters derived under the present invention from fatty acids of high molecular weight and polyhydric alcohols, it becomes much more stable. A further advantage resides in the fact that raw silk prepared in this way leaves no spots after being worked up. Mediocre silks are rendered more stable, so that a larger field of use is open to them.

A further sphere of application of these esters resides in their addition to oil-colors. In this case they prevent the pigment settling out when the paint is allowed to stand. For example, if glycol-monostearic ester is added to the customary red lead linseed oil paint, even 1.5 per cent is sufficient to prevent the settling-out of the pigment, without the paint being detrimentally influenced thereby.

What I claim is:

1. A process for the production of emulsions, in which polyhydric alcohols partially esterified with fatty acids of high molecular weight are emulsified with water or aqueous solutions of suitable substances in the presence of substances having an alkaline reaction.

2. A process for the production of emulsions, in which ethereal poly-compounds of at least one polyhydric alcohol partially esterified with fatty acids of high molecular weight are emulsified with water or aqueous solutions of suitable substances in the presence of substances having an alkaline reaction.

3. A process for the production of emulsions, in which polyhydric alcohols partially esterified with any derivatives of fatty acids of high molecular weight—and particularly their hydroxy-compounds or their unsaturated derivatives—are emulsified with water or aqueous solutions of any substances in the presence of substances having an alkaline reaction.

4. A process for the production of emulsions, in which ethereal poly-compounds of at least one polyhydric alcohol partially esterified with acids selected from a group consisting of fatty acids of high molecular weight, derivatives of said fatty acids, hydroxy-compounds of said fatty acids and unsaturated derivatives of said fatty acids, are emulsified with water or aqueous solutions of any substances in the presence of substances having an alkaline reaction.

5. In the production of emulsions, the process which comprises emulsifying in the presence of alkaline reacting substances, ethereal poly-compounds of high molecular fatty acids and of at least one polyhydric alcohol, with water and with oleaginous matter selected from a class consisting of fats, fatty acids, waxes, vegetable oils and mineral oils.

6. In the production of emulsions, the process which comprises reacting alkylene oxids with fatty acids of high molecular weight in the presence of an aqueous solution of alkali salts of said fatty acids as catalysts, thereby producing a mixture of partially esterified glycol esters and alkali salts of said fatty acids, and emulsifying the said resulting mixture with water or aqueous solutions of suitable substances.

7. In the production of emulsions, the process which comprises reacting alkylene oxides with oleaginous matter selected from a class consisting of fatty acids, natural fats and fatty acid containing oils in the presence of an aqueous solution of alkali salts of said fatty acids as catalysts, thereby producing a mixture of partially esterified glycol esters and alkali salts of said fatty acids, and emulsifying the said resulting mixture with water or aqueous solutions of suitable substances.

8. As a new composition of matter, an emulsion comprising water, polyhydric alcohols partially esterified with fatty acids of high molecular weight, and also containing substances of alkaline reaction; the external phase of the said emulsion comprising water.

9. As a new composition of matter, an emulsion comprising water, polyhydric alcohols partially esterified with fatty acids derived from matter selected from a class consisting of oils, fats and waxes, and also containing substances of alkaline reaction; the external phase of the said emulsion comprising water.

10. As a new composition of matter, an emulsion comprising water, polyhydric alcohols partially esterified with fatty acids of high molecular weight, oleaginous matter selected from a class consisting of fatty acids, waxes, natural fats and oils, and also containing substances of alkaline reaction; the external phase of the said emulsion comprising water.

11. As a new composition of matter, an emulsion comprising water, polyhydric alcohols partially esterified with fatty acids derived from oleaginous matter selected from a class consisting of oils, fats and waxes; additional oleaginous matter selected from a class consisting of fatty acids, waxes, natural fats and oils; and also containing substances of alkaline reaction; the external phase of the said emulsion comprising water.

12. As a new composition of matter, an emulsion comprising water, polyhydric alcohols partially esterified with acids selected from a class comprising fatty acids of high molecular weight, derivatives of said fatty acids, hydroxy-compounds of said fatty acids and unsaturated derivatives of said fatty acids; and also containing substances of alkaline reaction; the external phase of the said emulsion comprising water.

13. As a new composition of matter, an emulsion comprising water, polyhydric alcohols partially esterified with acids selected from a class comprising fatty acids of high molecular weight, derivatives of said fatty acids, hydroxy-compounds of said fatty acids and unsaturated derivatives of said fatty acids; oleaginous matter selected from a class consisting of fatty acids, waxes, natural fats and oils; and also containing substances of alkaline reaction; the external phase of the said emulsion comprising water.

In testimony whereof I affix my signature.

HANS SCHRADER.